United States Patent Office 2,754,188
Patented July 10, 1956

2,754,188

HERBICIDAL COMPOSITION

Howard L. Yowell, Westfield, and John F. McKay, Cranford, N. J., assignors to Esso Research and Engineering Company, a corporation of Delaware No Drawing. Application February 4, 1954,
Serial No. 408,286

2 Claims. (Cl. 71—2.6)

The present invention relates to compositions for killing weeds, and more particularly, to improved compositions which will kill only the weeds to which they are applied and will not have adverse effects upon neighboring growths. Still more specifically, the present invention relates to improved compositions containing, as active herbicidal agents, halogen substitution products of phenoxy carboxylic acids, such as 2,4-dichlorophenoxyacetic acid, 2,4,5- and 2,4,6-trichlorophenoxyacetic acid, trichlorophenoxypropionic acids, their homologues and analogues.

2,4-dichlorophenoxyacetic acid and 2,4,5-trichlorophenoxyacetic acid and their derivatives are particularly well known in the art to be effective plant hormone herbicides. Such products are widely used to control weeds and brush that reduce crop yields, block utility rights-of-way, stifle growth of pastures, and detract from the beauty of landscaping and scenery. The acids themselves are usually applied to the unwanted weeds and brush by either spraying or dusting; if by spraying, this is generally carried out by employing an aqueous solution or emulsion of a water-soluble salt of the acid, the latter being quite water-insoluble. As water soluble salt the sodium or the amine salts have been used. These compounds are relatively non-volatile, and hence are desirable, but their herbicidal activity is poor. Oil-soluble formulations containing these acids as active ingredients are also available, such as the isopropyl or amyl esters. These materials have a considerably higher potency than the salts, but their use is accompanied by a severe drawback, their tendency to drift.

"Drifting" is a phenomenon which is, to some extent, associated with vaporization and volatility and, in the case of weed killers, is the tendency of a composition to wander from the plot of ground to which it is applied over to neighboring fields. Certain crops, notably cotton, are extremely susceptible to 2,4-dichlorophenoxyacetic acid and its derivatives and can be severely damaged by vapors of the weed killer which may "drift" from fields which are planted with crops tolerant to the weed killer, such as rice, which may have been treated with the chemical for weed control. Most of the esterified forms of 2,4-D and 2,4,5-T, as these weed killers are commonly known, have high "drifting" characteristics and are thus hazardous to use in areas where the possibility of crop injury to neighboring 2,4-D non-tolerant crops exist. Furthermore, because of the high volatility of available esterified forms of 2,4-D, the residual activity of the herbicide suffers and weed control is not as long-lasting as would be desirable.

It is, therefore, the principal purpose of the present invention to set forth a herbicide and weed killing composition incorporating the halogen substitution products of aryloxyalkyl carboxylic acids which, while being oil-soluble, are of high potency and do not exhibit the "drifting" characteristics hitherto associated with esters of 2,4-D and 2,4,5-T, a characteristic so undesirable that in some states the use of esters of these acids is banned.

It is a further object of the present invention to set forth a herbicide which has substantially greater weed killing characteristics than commercially available compositions incorporating various forms of 2,4-D and 2,4,5-T, and is considerably more economic to prepare and use.

Other and further objects and advantages of the present invention will appear hereinafter.

The present invention is based upon the discovery that when 2,4-dichloro and 2,4,5-trichlorophenoxyacetic acids are esterified with mixtures of certain branch chained primary alcohols, and specifically the alcohols produced by carbonylation of certain branched olefin fraction, there are obtained ester products which not only are of high herbicide potency but also are substantially free of the undesirable "drifting" characteristics hitherto associated with the esters. Surprisingly, this "drifting" is not particularly a function of the molecular weight of the alcohol for, as shown below, the corresponding straight chain primary alcohol of the same molecular weight has pronounced "drifting" characteristics. This is particularly surprising in view of the well known fact that branch chained alcohols and esters are substantially more volatile than the corresponding straight chain compounds.

The carbonylation, or Oxo, reaction, as it is commonly called, whereby the alcohol mixtures employed in the present invention are prepared, is now well known in the art. It is a two-stage synthesis process wherein, in a first stage, olefins, CO, $H_2$, and a cobalt catalyst are reacted at pressures of about 2000–4000 p. s. i. g. and temperatures of 275–375° F. to form an aldehyde product containing one more carbon atom than the parent olefin, and the aldehyde product is subsequently hydrogenated to form the corresponding alcohol. Because of the nature of the reaction, except in the case of where ethylene is the feed, a single alcohol product is hardly ever obtained, for the CO and $H_2$ may add on to either of the two carbon atoms of the olefinic linkage. The process is described in U. S. Patents 2,327,066 to Roelen; 2,504,682 to Harlan, and many subsequent patents.

In accordance with the present invention, the alcohol product obtained when an olefin or olefin mixture having at least 6 carbon atoms in the molecule is employed as feed to the first stage of this reaction is esterified with the halogenated phenoxyalkylcarboxylic acid to form an ester product showing little or no "drift." In particular, this characteristic is best shown when there is employed as a feed to the Oxo stage a polypropylene fraction boiling in the heptene and higher range. Polypropylene is produced by acid polymerizing of propylene either alone or preferably with varying amounts of butylenes. The reaction product is a highly branched olefinic mixture, consisting principally of $C_6$, $C_7$, $C_9$, and $C_{12}$ olefinic components as well as minor amounts of other olefins. Furthermore, each component or fraction, such as the $C_7$ fraction, consists of a variety of branched heptenes which, after carbonylation and hydrogenation results in a mixture of primary octyl alcohols having a branched chain structure. Thus the $C_7$ polypropylene fraction gives rise to an isooctyl alcohol product consisting of about 25% 4,5-dimethyl hexanol; 30% of 3,5-dimethyl hexanol; 20% of 3,4-dimethyl hexanol; the balance are methyl heptanols and trimethyl pentanols.

Similarly, the alcohols obtained by carbonylating the $C_9$ fraction is found to consist principally of trimethyl heptanols, while the $C_{12}$ fraction on carbonylation yields a mixture of tetramethyl nonanols, all, of course, primary alcohols. These alcohol mixtures, on esterification with 2,4-D or 2,4,5-T all exhibit high weed killing potency combined with excellent non-drifting characteristics.

It has further been found that the still pot residue after distillation of the alcohol fraction, sometimes referred to as "Oxo bottoms," not only has good weed-killing and herbicidal activity in its own right, but that it too may be esterified with the halogenated phenoxyacetic acids to produce an even more powerful weed killer and herbicide which will not "drift." In the carbonylation of a $C_7$ olefin polymer (i. e. polypropylene) fraction, the bottoms represent about 15–30% of the crude alcohol charged to the distillation zone. The bottoms consist of $C_{15}$–$C_{16}$ alcohols, $C_{24}$ acetals, $C_{16}$ ethers, and minor amounts of esters, ketones and aldols and higher boiling oxygenated organic compounds.

The following examples illustrate the preparation of the 2,4-D esters of these Oxo reaction products. The 2,4,5-T esters can be made by similar reactions.

EXAMPLE 1

*Preparation of isooctyl ester of 2,4-D*

65 g. isooctyl alcohol (from Oxo synthesis), 110.5 g. 2,4-D acid and 100 ml. toluene diluent were placed in an esterification apparatus and the mixture refluxed with stirring until the reaction was complete. 8.2 ml. water were formed. The toluene was then separated from the reaction mixture by vacuum distillation. Unreacted 2,4-D acid was separated by treating with aqueous sodium carbonate followed by ether extraction of the ester. 125 g. of ester were obtained (75.5% of theoretical) of 95.5% purity as indicated by chlorine analysis. The density of the ester was 1.12.

EXAMPLE 2

*Preparation of $C_{10}$ Oxo ester of 2,4-D*

79 g. $C_{10}$ Oxo alcohol, 110.5 g. 2,4-D acid and 100 ml. toluene were reacted in the manner described in Example 1. The yield was 143 g. of ester which had a density of 1.12.

EXAMPLE 3

*Preparation of $C_{11}$ Oxo ester of 2,4-D*

93 g. $C_{11}$ Oxo alcohol, 110.5 g. 2,4-D acid and 100 ml. toluene were reacted in the manner described in Example 1. The yield was 144 g. of ester which had a density of 1.10.

EXAMPLE 4

*Preparation of $C_{13}$ Oxo ester of 2,4-D*

100 g. $C_{13}$ Oxo alcohol, 110.5 g. 2,4-D acid and 100 ml. toluene were reacted in the manner described in Example 1. The yield was 150 g. of ester of 94% purity as indicated by chlorine analysis. The density was 1.06.

EXAMPLE 5

*Preparation of Oxo bottoms ester of 2,4-D*

Oxo bottoms is treated with 2,4-D acid in an esterification unit which permits water of formation to be continuously removed from the system. The 2,4-D acid reacts with the complex mixture of high alcohols contained in Oxo bottoms to form mixed high boiling esters of 2,4-D which are soluble in the unreacted portion of the Oxo bottoms. Thus, a stable, high boiling oil concentrate containing up to 40 wt. percent of the herbicidally active 2,4-D acid can be prepared. This composition will tolerate addition of an emulsifying agent which then makes it possible to dilute the 2,4-D Oxo bottoms concentrate with water in the field for convenient application. The new composition is also completely miscible with petroleum oils such as diesel oil, fuel oil, etc.

Six hundred grams of Oxo bottoms were washed with water in a separatory funnel and dried over anhydrous sodium sulfate. This washed Oxo bottoms was placed in an esterification apparatus together with 400 grams of 2,4-D acid and 120 ml. of toluene to act as a diluent. The mixture was refluxed with stirring for two hours and the separated water withdrawn from the system. 36 ml. of water were formed. The toluene was then separated from the reaction mixture by vacuum distillation. The product was cooled to room temperature, mixed with decolorizing charcoal and filtered. A clear amber colored liquid was obtained. Chlorine analysis of this product showed it to contain 40 wt. percent 2,4-D acid equivalent. Composition A (column 5) was prepared from this product by mixing it with an emulsifier in the proportions 94.76 wt. percent of the above described reaction product containing 40 wt. percent of Oxo bottoms ester of 2,4-D and 5.24 wt. percent emulsifier. 1.25 quarts of Composition A contained 1 pound of 2,4-D acid equivalent. Its density was 1.00.

The desired low volatility characteristics of these compounds were demonstrated in the following biological tests:

Solutions of the Oxo esters of 2,4-D and other esters used for purposes of comparison were prepared by dissolving 10 mg. of 2,4-D acid equivalent per ml. of a horticultural spray oil. This spray oil is a paraffinic white oil with a boiling range of 400–600° F. at atmospheric pressure.

The test plants were prepared by placing seeds of a single cross hybrid corn, TX 61 MXL10, in a germinator for about 48 hours. At the end of this time, these germinated kernels having roots 10–15 mm. in length were transferred to 15 cm. Petri dishes, using 20 kernels per dish. The bottom of each dish was covered with two 12.5 cm. filter papers and 15 ml. of distilled water before the corn seeds were placed in them. A watch glass containing an exact quantity of the esters of 2,4-D in the horticultural spray oil was placed in each Petri dish containing the germinated corn. Thus, the 2,4-D could contact the corn seedlings only by vaporization. The area of the exposed surface was approximately 5.8 cm.$^2$ in the case of the 8 mg. quantities of 2,4-D (on an acid equivalent basis) used in these experiments. The Petri dishes were covered and stored in the dark for the specified time at room temperature, about 72° F.). The length of the roots on the corn seedlings in each Petri dish was then measured and compared with a check experiment in which no 2,4-D was used. The data in the following table show that the isooctyl, $C_{10}$ and $C_{11}$ Oxo esters of 2,4-D had less effect on root elongation than the butoxyethanol ester of 2,4-D which is widely used commercially as a low volatility ester.

| 2,4-D Ester | Root Length Expressed As Percent of Check |
| --- | --- |
| $C_8$ Oxo (isooctyl) | 88.5 |
| $C_{10}$ Oxo | 89.9 |
| $C_{11}$ Oxo | 98.5 |
| $C_{13}$ Oxo | |
| Butoxyethanol | 71.6 |
| Isopropyl | 14.0 |
| Check | 100 |

In a separate experiment, the $C_{13}$ Oxo ester of 2,4-D was compared with the butoxyethanol ester of 2,4-D. The following data show that the $C_{13}$ ester, because of its good "drift" characteristics, had less effect on the root elongation than the butoxyethanol ester.

| 2,4-D Ester | Root Length Expressed As Percent of Check |
| --- | --- |
| $C_{13}$ Oxo | 101.3 |
| Butoxyethanol | 91.0 |
| Isopropyl | 14.0 |
| Check | 100.0 |

In another set of experiments isooctyl and isodecyl alcohols prepared by the carbonylation reaction (i. e. Oxo alcohols) were compared with the corresponding normal straight-chain $C_8$ and $C_{10}$ alcohols. The following data clearly show that the Oxo alcohols had substantially less effect on the root elongation than the corresponding straight chain esters, due to their excellent non-drifting characteristics.

| 2,4-D Ester | Root Length Expressed As Percent of Check | Root Length, mm. |
|---|---|---|
| n-C$_8$ | 100.5 | 4,702 |
| Iso C$_8$ (Oxo) | 106.1 | 4,964 |
| n-decyl | 73.2 | 4,616 |
| Iso-decyl (Oxo) | 89.9 | 5,666 |

The data given in the following table show the superior residual weed control activity of the composition formed by reacting Oxo bottoms with the halogenated phenoxyacetic acid over commercially available compounds of 2,4-D. The experiments summarized in this table were conducted to control Johnson grass in sugar cane. In these tests, the Johnson grass seedlings were 2–3 inches high when sprayed. Four weeks later there were no surviving seedlings in any of the treated plots, but five weeks after spraying numerous new Johnson grass seedlings were starting to grow and these were counted to compare residual effectiveness of the treatments. The new composition was superior to any of the commercial forms of the herbicide in this respect. The results reported on the check plots do not reflect the degree of control, since they were covered with such a dense overgrowth of mature Johnson grass that new seedlings could not possibly emerge in the untreated areas.

RESIDUAL ACTIVITY OF COMPOSITIONS OF 2,4-D FOR CONTROLLING JOHNSON GRASS

| Treatment [1] | New Johnson Grass Seedlings/3 sq. yds.[2] |
|---|---|
| 2 lbs. Composition A [3]+20 gal. Emul. Diesel Oil | 3 |
| 2 lbs. Composition A[3]+10 gal. Diesel Oil | 4 |
| 2 lbs. Methyl ethyl ester 2,4-D+20 gal. Diesel Oil | 5 |
| 2 lbs. Methyl ethyl ester 2,4-D+20 gal. Emul. Diesel Oil | 6 |
| 2 lbs. Amine [4] 2,4-D+10 gal. Diesel Oil | 7 |
| 2 lbs. Amine 2,4-D+10 gal. Emul. Diesel Oil | 9 |
| 2 lbs. Amine 2,4-D+20 gal. Emul. Diesel Oil | 10 |
| 2 lbs. Amine 2,4-D+20 gal. Diesel Oil | 13 |
| Check | [5] 4 |

[1] Johnson grass seedlings were 2–3 inches tall. All 2,4-D treatments correspond to 2 lbs. of acid equivalent per acre.
[2] Counted on 34th day after application.
[3] Composition A is Oxo bottoms ester of 2,4-D containing an emulsifier. Its preparation is described in Example 5.
[4] Triethanol amine salt.
[5] Plots overgrown with mature Johnson grass and choked out all new seedlings on which measurements were made.

Other field tests demonstrate the desirable low drifting characteristics of the products of the present invention. In these tests, plots of ground were sprayed with a commercial preparation of the isopropyl ester of 2,4-D, a commercial preparation consisting of mixed isopropyl and triethyl amine salts of 2,4-D, and Composition A, described in Example 5. All applications were at rates of 2 pounds per acre of 2,4-D acid equivalent. One, three, and seven days after application of the 2,4-D compounds to the soil, potted tomato plants were placed on the treated plots and covered with baskets. At intervals thereafter, the tomato plants were inspected to determine the extent of the plant injury resulting from 2,4-D vapors which drifted from the soil. (Tomato plants are extremely susceptible to 2,4-D injury.) Both of the commercial preparations of 2,4-D gave very severe injury to the tomato plants in 24 hours. Stunting of growth and eventual plant death in some cases occurred. The tomato plants on the plots treated with Composition A, however, were relatively unaffected and continued to grow lushly. At the conclusion of the test, these plants appeared as healthy as control tomato plants.

The Oxo esters of the present invention may be applied in the following ways:

Impregnated on clay and used as a dust.
Dissolved in oil and sprayed directly.
Dissolved in oil, emulsified in water and sprayed as an oil emulsion.
Emulsified in water and sprayed as such.

The esters of the invention are usually liquid and are good solvents for 2,4-D or 2,4,5-T or mixtures of the two acids. Consequently, in certain instances it may be desirable to employ excess 2,4-D acids in the synthesis step and produce a product comprising a concentrate of 2,4-D acid dissolved in the 2,4-D ester. This product could then be applied in any of the methods described above. Furthermore, 2,4,5-T or mixtures of 2,4-D and 2,4,5-T acids could be used in the esterification reactions with the Oxo alcohols to produce alternate plant hormone herbicides. In addition, other plant hormones in which the active constituents are acids, such as alpha-naphthalene-acetic, indolebutyric, etc., acids can be employed in this invention.

Furthermore, the alcohols that may be employed in the process of the present invention include not only the branch chained alcohols indicated, but also their derivatives and dimers. Thus, the alcohols may be condensed in the presence of an alkaline condensation agent, such as NaOH, to form the dimeric alcohol in accordance with the Guerbet reaction. These dimer alcohols not only possess the branchiness of the original Oxo alcohols but also additional branching due to the condensation reaction.

Dimerized Oxo alcohols may also be produced during the Oxo process itself by the addition of zinc or other reaction modifiers. Also, the Oxo aldehydes may be aldolized, dehydrated and hydrogenated to yield the corresponding dimeric alcohols.

Examples of esters of 2,4-D and 2,4,5-T prepared from these dimerized alcohols are the following:

*Preparation of C$_{16}$ ester of 2,4-dichlorophenoxyacetic acid.*—A 5-liter flask equipped with a thermometer, water trap and condenser was charged with:

884 g. 2,4-dichlorophenoxyacetic acid _____ m__ 4.0
1065 g. dimerized C$_8$ Oxo alcohol
  (i. e. C$_{16}$ alcohol) _____ m__ 4.4
200 cc. toluene.

This mixture was refluxed for 2¾ hours during which 73 cc. of water was removed. Then it was stripped of toluene in a short bath still under reduced pressure followed by the unreacted alcohol. The C$_{16}$ dimer ester was then distilled over at 182° to 185° C. at 0.2 mm. Hg. This ester amounted to 1690 g. Yield=95%.

*Preparation of C$_{16}$ ester of 2,4,5-trichlorophenoxyacetic acid.*—A similar procedure to that described above was carried out with 2,4,5-trichlorophenoxyacetic acid and C$_{16}$ dimerized Oxo alcohol. The resulting ester distilled at 182° to 190° C. at 0.1 mm. Hg. Yield=92%. Thus, particularly suitable as weed killers are the C$_8$, the C$_{10}$, and the C$_{13}$ alcohol esters, Oxo esters of 2,4 dichloro and 2,4,5 trichlorophenoxy acetic acid, and the dimeric (C$_{16}$, C$_{20}$ and C$_{26}$) alcohol esters of these acids.

The compositions of the present invention are effective and may be used in concentrations of from 1–25 lbs. equivalent of 2,4-D or 2,4,5-T per 100 gallons of the finished spray per acre. A particularly desirable liquid vehicle is one comprising 10–25% of a diesel oil fraction and 75–90% water. Wetting, dispersing, and emulsifying agents may also be included in the formulation.

What is claimed is:

1. A method for killing weeds which comprises applying to the weeds at a phytotoxic rate the reaction product of a halogenated acid selected from the group consisting of 2,4-dichlorophenoxyacetic acid and 2,4,5-trichlorophenoxyacetic acid and the mixture of oxygenated organic compounds produced as the still bottoms product of the Oxo reaction wherein $H_2$, CO and an olefin having from 6 to 15 carbon atoms is contacted at under carbonylation reaction conditions elevated temperatures and pressures in the presence of a carbonylation catalyst in a first stage to produce an aldehyde product having one more carbon atom than said olefin, and said aldehyde product hydrogenated in a second stage to the corresponding alcohol product and thereafter removing the major portion of the $C_7$–$C_{16}$ alcohol component by distillation, leaving behind said still bottoms product.

2. A herbicidal composition containing a phytotoxic concentration of the reaction product of a halogenated acid selected from the group consisting of 2,4-dichlorophenoxyacetic acid and 2,4,5-trichlorophenoxyacetic acid and the mixture of oxygenated organic compounds produced as still bottoms product of the Oxo reaction wherein $H_2$, CO, and an olefin having from 6 to 15 carbon atoms is contacted at under carbonylation reaction conditions, elevated temperatures and pressures in the presence of a carbonylation catalyst to produce an aldehyde product which is subsequently hydrogenated to the alcohol product and thereafter removing the major portion of the $C_7$ to $C_{16}$ alcohol component by distillation, leaving behind said still bottoms product.

References Cited in the file of this patent

UNITED STATES PATENTS

| | | |
|---|---|---|
| 2,614,919 | Warren | Oct. 31, 1952 |
| 2,625,527 | Smith | Jan. 1, 1953 |

FOREIGN PATENTS

| | | |
|---|---|---|
| 957,991 | France | Aug. 29, 1949 |

OTHER REFERENCES

"Chemical Industries," August 1948, page 211.

Newman et al.: "Chemical Abstracts," vol. 41, col. 3774 and 3775 (1947).

Munch-Petersen: "Chemical Abstracts," vol. 46, col. 470–471 (1952).

Baskin et al.: "Chemical Abstracts," vol. 47, col. 5617 (1953).

"Agricultural Chemicals," December 1952, page 26.